United States Patent [19]

Moffatt

[11] Patent Number: 5,108,501

[45] Date of Patent: Apr. 28, 1992

[54] BILE SALTS WHICH CONTROL KOGATION IN THERMAL INK-JET INKS

[75] Inventor: John R. Moffatt, Corvallis, Oreg.

[73] Assignee: Hewlett-Packard Company, Palo Alto, Calif.

[21] Appl. No.: 724,649

[22] Filed: Jul. 2, 1991

[51] Int. Cl.⁵ .............................................. C09D 11/02
[52] U.S. Cl. ....................................... 106/20; 106/22
[58] Field of Search .............................. 106/20, 22, 25

[56] References Cited

U.S. PATENT DOCUMENTS

| 65,002 | 5/1867 | Owens | 106/20 |
| 78,258 | 5/1968 | Buzby | 106/25 |
| 1,334,722 | 3/1920 | Tsutsumi | 106/25 |

Primary Examiner—William R. Dixon, Jr.
Assistant Examiner—Helene Klemanski

[57] ABSTRACT

Bile salts, such as sodium cholate, when added to inks used in thermal ink-jet printers, control kogation.

32 Claims, 2 Drawing Sheets

BILE SALTS WHICH CONTROL KOGATION IN THERMAL INK-JET INKS

TECHNICAL FIELD

The present invention relates to thermal ink-jet printing, and, more particularly, to reducing kogation in inks.

BACKGROUND ART

Thermal ink-jet printers offer a low-cost, high quality, and comparatively noise-free option to other types of printers commonly used with computers. Such printers employ a resistor element in a chamber provided with an egress for ink to enter from a plenum The plenum is connected to a reservoir for storing the ink A plurality of such resistor elements are arranged in a particular pattern, called a primitive, in a printhead. Each resistor element is associated with a nozzle in a nozzle plate, through which ink is expelled toward a print medium. The entire assembly of printhead and reservoir comprises an ink-jet pen.

In operation, each resistor element is connected via a conductive trace to a microprocessor, where current-carrying signals cause one or more selected elements to heat up. The heating creates a bubble of ink in the chamber, which is expelled through the nozzle toward the print medium. In this way, firing of a plurality of such resistor elements in a particular order in a given primitive forms alphanumeric characters, performs area-fill, and provides other print capabilities on the medium.

A problem with inks used in such thermal ink-jet printers is that the repeated heating of the resistor element over several hundreds of thousands or over millions of firings can cause breakdown of the ink, especially the organic components, such as the dye, with consequent fouling of the surface of the resistor element. This process has been termed "kogation", which is defined as the build-up of residue (koga) on the resistor surface. The build-up of residue degrades pen performance by reducing the volume of delivered ink over pen lifetime.

In the anionic dyes (sulfonate or carboxylate) commonly employed in aqueous inks used in thermal ink-jet printing, sodium is generally the counter-ion used. While dyes containing sodium counter-ions generally provide good print quality, in some inks, sodium counter-ions have been found to contribute to the kogation problem.

Various ink compositions and processes have been developed in an effort to reduce kogation. One solution has been to partially or totally replace the counter-ion on the dye with a replacement counter-ion, such as lithium and tetramethylammonium. In other instances, oxo anions, such as phosphates, have been shown to reduce kogation, at least in some inks.

Yet, other inks experience a decrease in drop volume over the life of the pen. A change in drop volume may indicate the formation of resistor residues, and hence the presence of kogation.

Originally, the problem was associated with a build-up of organic residue visible upon microscopic examination of the resistor pads with pen lifetime. Thus, the coated resistors were less efficient at heat transfer than those that were not coated. However, there are cases where decreases of drop volume with pen lifetime occur in the absence of any visible residue accumulation on the resistor pads. Clearly, in both cases interference in bubble generation occurs, but a common explanation has remained elusive. It is believed that both the surface chemistry and/or solution chemistry of the ink could be the cause of the problem.

As an example, an ink containing 1.01% N,N-dimethyl-N-(Z-9-octadecenyl)-N-amine oxide (OOAO), 2.24% SURFYNOL 465 (SURFYNOL is a trademark of Air Products and Chemicals, Inc.), 0.28% sodium alginate (low viscosity from Sigma), 9% 1,5-pentanediol, 0.3% UCARCIDE (from Union Carbide), one of the following dyes: 1.5% Acid Red 52-Na, 1.3% Acid Blue 9-Na, Direct Yellow 86-TMA, or 0.5% Acid Yellow 23-TMA, where TMA is tetramethylammonium cation in place of Na cation, and the balance water, shows a decrease of deliverable drop volume with pen lifetime at 45% over the turn-on-energy (TOE) of the pen for both the cyan and yellow inks. The magenta ink appears to be unaffected. This energy is at the upper operating energy of the pen and printer, and while the number of pen and printer combinations that might experience this problem is small, a potential problem exists.

In an attempt to relieve the problem, $(NH_4)_2HPO_4$ was tried at the level of 0.5%. Use of this reagent was unsuccessful in this system. Although the yellow ink kogation improved, the cyan ink still experienced a 20 to 30% deviation in drop volume over pen lifetime. Severe decap and crusting performance problems occur at this level of $(NH_4)_2HPO_4$ for both inks, and thus this reagent, which has successfully been used with other inks (see, U.S. patent application Ser. No. 07/428,282, filed Oct. 27, 1989, and assigned to the same assignee as the present application), could not be used with these inks.

The need remains for the development of inks having reduced kogation, and hence resulting in longer pen life, using low cost chemicals with minimal additional processing.

DISCLOSURE OF INVENTION

In accordance with the invention, bile salts have been found to control kogation in certain inks. Sodium cholate, a bile salt, forms micelles in aqueous solution. The kogation problem for the yellow and cyan inks described above improves markedly upon the addition of a small amount of sodium cholate.

BEST MODES FOR CARRYING OUT THE INVENTION

Figure 1:
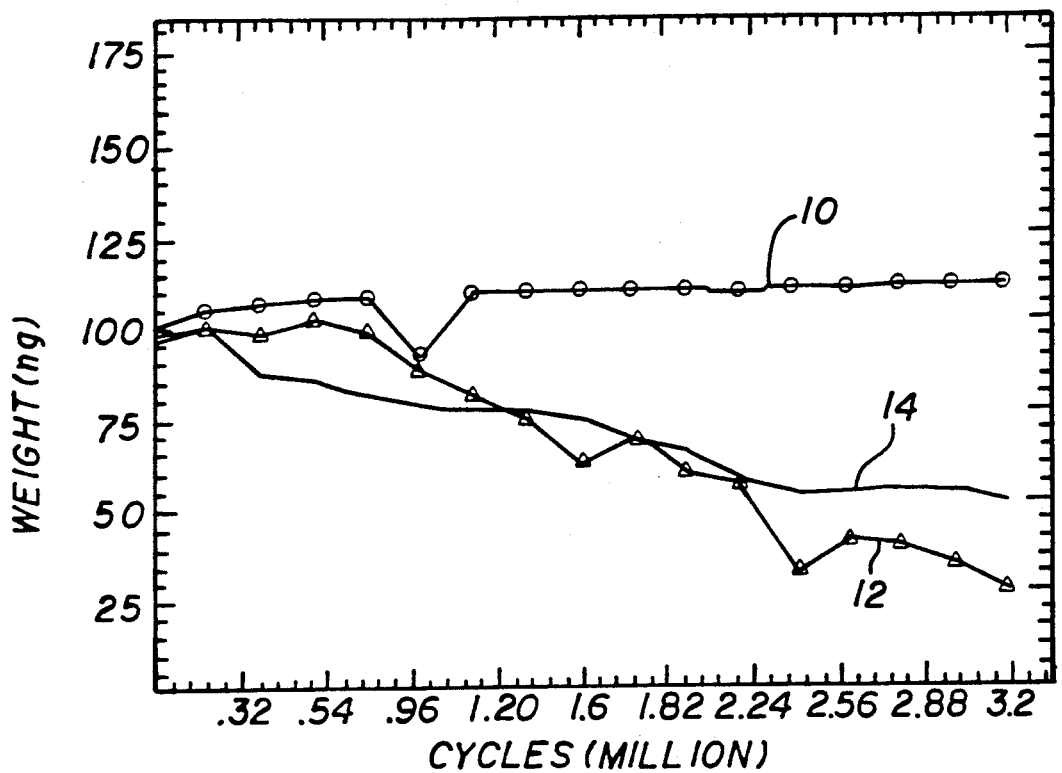
FIG. 1, on coordinates of weight (in nanograms, ng) and number of cycles (resistor firings), is a plot of drop weight versus cycles for three different inks (each having an identical composition, except for the dye)

FIG. 1 depicts the ink discussed above without any attempt to solve the kogation problem. The magenta ink (Curve 10) is seen to be relatively unaffected, while both the cyan (Curve 12) and yellow (Curve 14) inks show a marked decrease in drop volume.

Figure 2:
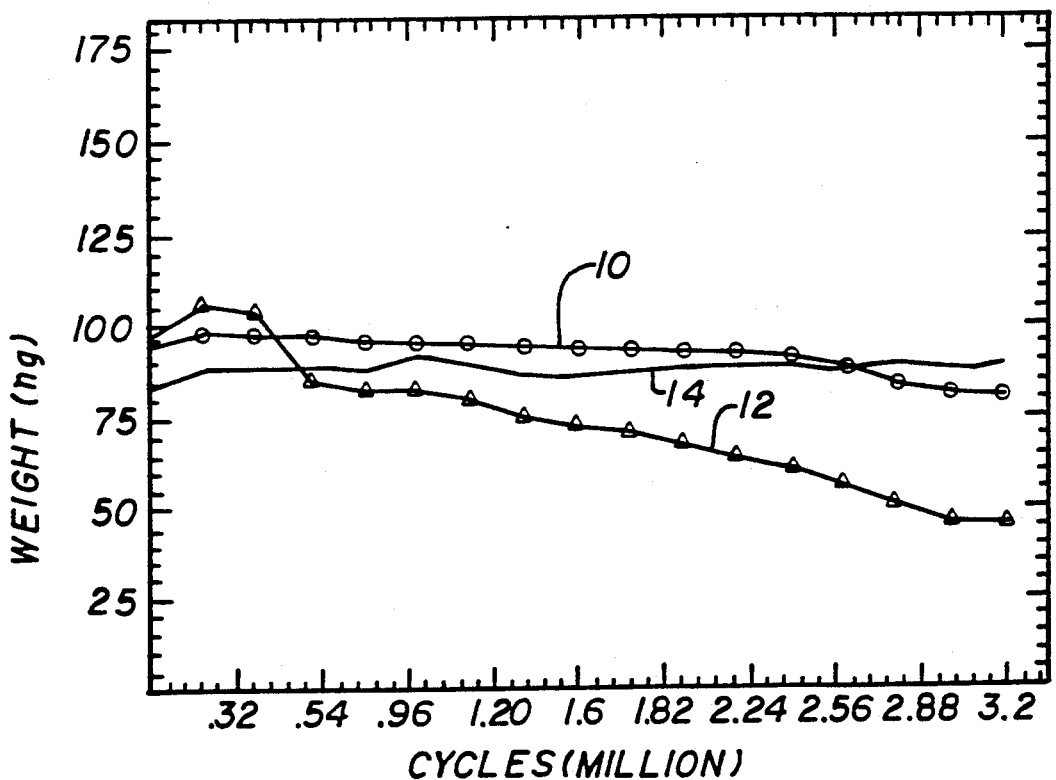
FIG. 2 is a plot similar to that of FIG. 1, the difference being that the ink compositions include $(NH_4)_2HPO_4$.

The addition of 0.5% $(NH_4)_2HPO_4$ is seen to improve the yellow ink in FIG. 2; however, the cyan ink still shows a decrease in drop volume.

Figure 3:
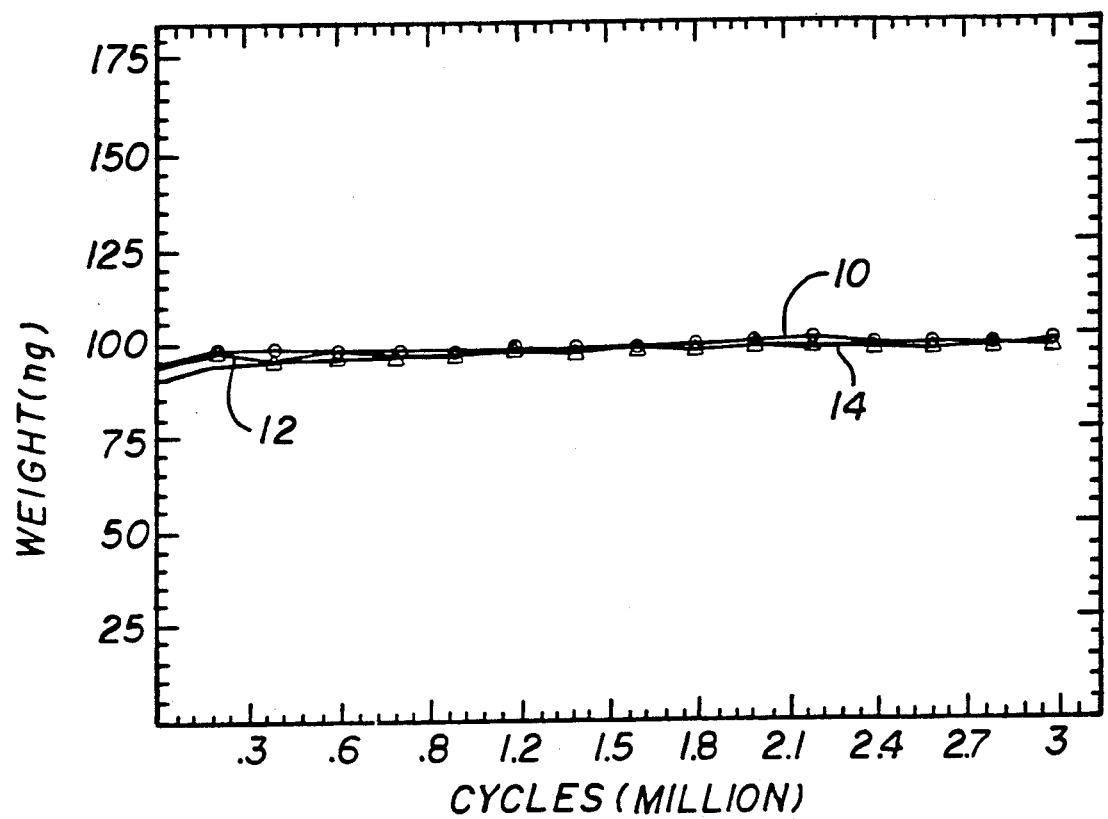
FIG. 3 is a plot similar to that of FIG. 1, the difference being that the ink compositions include a bile salt in accordance with the invention.

FIG. 3 depicts the result of using 0.5% sodium cholate in the ink. The kogation problem for the yellow and cyan inks improve markedly upon addition of the small amount of sodium cholate.

Figure 4:
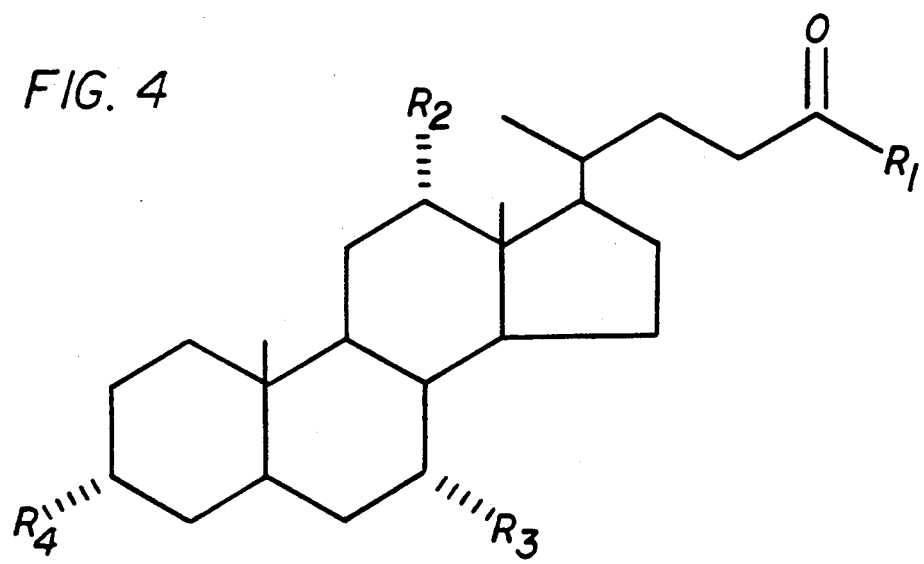
FIG. 4 is a representation of the general bile salt formula used in the practice of the invention.

Other bile salts may also be employed to control kogation. Examples of such other salts, in addition to cholate, are listed in Table I, below. The general formula for the bile salts is shown in FIG. 4.

TABLE I

Examples of Bile Salts.

| Name | $R_1$ | $R_2$ | $R_3$ | $R_4$ |
|---|---|---|---|---|
| cholate | $O^-$ | OH | OH | OH |
| deoxycholate | $O^-$ | OH | H | OH |
| chenodeoxycholate | $O^-$ | H | OH | OH |
| glycholate | $NH-CH_2-COO^-$ | OH | OH | OH |
| taurocholate | $NH-(CH_2)_2-SO_3^-$ | OH | OH | OH |

The cations associated with the bile salts are selected from the group consisting of lithium, potassium, cesium, sodium, magnesium, manganese, ammonium, quaternary ammonium salts, such as tetramethylammonium and tetrabutylammonium salts, etc. The sodium and lithium ions are especially preferred, due to their high hydrophilic nature.

The concentration of the bile salts ranges from about 0.1 to 3 wt%, and preferably about 0.5 wt%. Below 0.1 wt%, the bile salt is not effective in controlling kogation. Increasing the bile salt concentration above about 3% has no noticeable improvement on kogation or on alleviating drop volume roll-off over pen lifetime.

The inks that may be beneficially improved by the addition of bile salts are those inks prepared with water-soluble anionic dyes, such as those anionic dyes having one or more sulfonate or carboxylate groups thereon. The inks comprise from about 1 to 15 wt% of a glycol and/or lactam, from about 0.5 to 5 wt% of the anionic dye, and the balance water.

Any of the well-known water-soluble glycols may be employed in the practice of the invention; examples of suitable glycols include ethylene glycol, diethylene glycol, triethylene glycol, tetraethylene glycol, propylene glycol, polyethylene glycol, polypropylene glycol, 1,5-pentanediol, and mixtures thereof. In general, any di- or tri-glycol of 10 carbon atoms or less may be used. Preferably, diethylene glycol or 1,5-pentanediol is employed.

Any of the simple (5-, 6-, or 7-membered rings) lactams may also be employed in the practice of the invention; examples of suitable lactams include 2-pyrrolidone, N-pyrrolidone, N-methyl pyrrolidone, N-hexyl pyrrolidone, N-(2-hydroxyethyl)pyrrolidone, caprolactam and mixtures thereof. Preferably, 2-pyrrolidone is employed.

Additional components may be added to the ink. For example, it is common to add a bactericide, such as UCARCIDE, available from Union Carbide (Danbury, CT) or NUOSEPT 95, available from Hüls America (Piscataway, NJ). The amount added is typically about 0.3 to 0.5 wt% of the total ink composition.

Further, certain other components have been found to improve print quality when added to the ink. These include about 0.1 to 0.3 wt% alginate (especially the sodium, calcium, or potassium forms), 0.5 to 5 wt% of a zwitterionic surfactant, as described more fully below, and 0 to about 5 wt% of an acetylenic polyethylene oxide surfactant, such as available under the trade designation SURFYNOL 465 from Air Products & Chemicals, Inc.

An example of a suitable zwitterionic surfactant is an amine oxide, such as N,N-dimethyl-N-dodecyl amine oxide (NDAO):

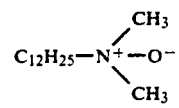

Also, in place of the $C_{12}H_{25}$—moiety, any aliphatic (straight chain or branched) R moiety may be used. The following amine oxides and abbreviation thereof are also useful in the practice of the invention:

N,N-dimethyl-N-tetradecyl amine oxide (NTAO);
N,N-dimethyl-N-hexadecyl amine oxide (NHAO);
N,N-dimethyl-N-octadecyl amine oxide (NOAO);
N,N-dimethyl-N-(Z-9-octadecenyl)-N-amine oxide (OOAO).

Preferably, OOAO is employed as the amine oxide.

Other zwitterionic surfactants suitably employed in the practice of the invention include N-docecyl-N,N-dimethyl-N-glysinate:

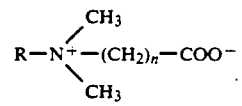

(where R is $C_{12}H_{25}$ and n = 1) and N-dodecyl-N,N-dimethyl-N-(2-ammoniopropanecarboxylate) (where R is $C_{12}H_{25}$ and n = 2). Generally, R can be any straight or branched alkyl chain which may contain an aryl group, such as phenyl or naphthyl.

INDUSTRIAL APPLICABILITY

The addition of bile salts, such as sodium cholate, to inks used in thermal ink-jet printing, is expected to find use in reducing kogation in thermal ink-jet inks.

Thus, there has been disclosed the use of bile salts with thermal ink-jet inks to reduce kogation therein. It will be appreciated by those skilled in the art that various changes and modifications of an obvious nature may be made, and all such changes and modifications are considered to fall within the scope of the invention as defined by the appended claims.

What is claimed is:

1. A method of reducing kogation in thermal ink-jet inks comprising adding from about 0.1 to 3 wt% of a bile salt to said ink.

2. The method of claim 1 wherein said bile salt has the formula

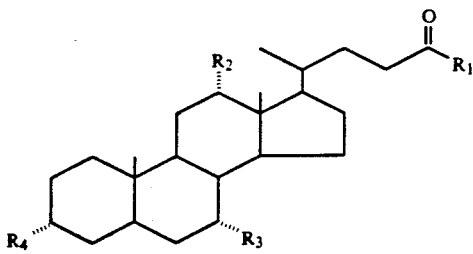

wherein $R_1$ is selected from the group consisting of O—, NH—CH$_2$—COO—, and NH—(CH$_2$)$_2$—SO$_3$—, $R_2$ and $R_3$ are independently selected from the group consisting of OH and H, and $R_4$ is OH.

3. The method of claim 2 wherein said bile salt is selected from the group consisting of

| Name | $R_1$ | $R_2$ | $R_3$ | $R_4$ |
|---|---|---|---|---|
| cholate | O$^-$ | OH | OH | OH |
| deoxycholate | O$^-$ | OH | H | OH |
| chenodeoxycholate | O$^-$ | H | OH | OH |
| glycholate | NH—CH$_2$—COO$^-$ | OH | OH | OH |
| taurocholate | NH—(CH$_2$)$_2$—SO$_3^-$ | OH | OH | OH. |

4. The method of claim 3 wherein each molecule of said bile salt has a cation associated therewith selected from the group consisting of lithium, potassium, cesium, sodium, magnesium, manganese, ammonium, and quaternary ammonium salts.

5. The method of claim 4 wherein said bile salt consists essentially of sodium cholate.

6. The method of claim 1 wherein the concentration of said bile salt is about 0.5 wt% of said ink.

7. The method of claim 1 wherein said ink comprises about 0.5 to 5 wt% of a water-soluble, anionic dye, about 1 to 15 wt% of a member selected from the group consisting of glycols and lactams, and the balance water.

8. The method of claim 7 wherein said glycol is selected from the group consisting of ethylene glycol, diethylene glycol, triethylene glycol, tetraethylene glycol, propylene glycol, polyethylene glycol, polypropylene glycol, 1,5-pentanediol, and mixtures thereof.

9. The method of claim 7 wherein said lactam is selected from the group consisting of 2-pyrrolidone, N-pyrrolidone, N-methyl pyrrolidone, N-hexyl pyrrolidone, N-(2-hydroxyethyl)pyrrolidone, caprolactam, and mixtures thereof.

10. The method of claim 1 wherein said ink further comprises about 0.1 to 0.3 wt% of an alginate, about 0.5 to 5 wt% of a zwitterionic surfactant, and 0 to about 5 wt% of an acetylenic polyethylene oxide surfactant.

11. A method of reducing kogation in thermal ink-jet inks comprising adding from about 0.1 to 3 wt% of sodium cholate to said ink.

12. The method of claim 11 wherein the concentration of said sodium cholate is about 0.5 wt%.

13. The method of claim 11 wherein said ink comprises about 0.5 to 5 wt% of a water-soluble, anionic dye, about 1 to 15 wt% of a member selected from the group consisting of glycols and lactams, and the balance water.

14. The method of claim 13 wherein said glycol is selected from the group consisting of diethylene glycol and 1,5-pentanediol, and wherein said lactam is 2-pyrrolidone.

15. The method of claim 11 wherein said ink further comprises about 0.1 to 0.3 wt% of sodium alginate, about 0.5 to 5 wt% of N,N-dimethyl-N-(Z-9-octadecenyl)-N-amine oxide, and 0 to about 5 wt% of an acetylenic polyethylene oxide surfactant.

16. The method of claim 4 wherein said quaternary ammonium salts are selected from the group consisting of tetramethylammonium and tetrabutylammonium salts.

17. A thermal ink-jet ink comprising a vehicle and at least one dye and containing about 0.1 to 3 wt% of a bile salt.

18. The ink of claim 17 wherein said bile salt has the formula

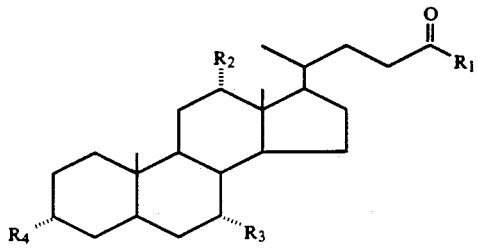

wherein $R_1$ is selected from the group consisting of O—, NH—CH$_2$—COO—, and NH—(CH$_2$)$_2$—SO$_3$—, $R_2$ and $R_3$ are independently selected from the group consisting of OH and H, and $R_4$ is OH.

19. The ink of claim 18 wherein said bile salt is selected from the group consisting of

| Name | $R_1$ | $R_2$ | $R_3$ | $R_4$ |
|---|---|---|---|---|
| cholate | O$^-$ | OH | OH | OH |
| deoxycholate | O$^-$ | OH | H | OH |
| chenodeoxycholate | O$^-$ | H | OH | OH |
| glycholate | NH—CH$_2$—COO$^-$ | OH | OH | OH |
| taurocholate | NH—(CH$_2$)$_2$—SO$_3^-$ | OH | OH | OH. |

20. The ink of claim 19 wherein each molecule of said bile salt has a cation associated therewith selected from the group consisting of lithium, potassium, cesium, sodium, magnesium, manganese, ammonium, and quaternary ammonium salts.

21. The ink of claim 20 wherein said bile salt consists essentially of sodium cholate.

22. The ink of claim 17 wherein the concentration of said bile salt is about 0.5 wt% of said ink.

23. The ink of claim 17 comprising about 0.5 to 5 wt% of a water-soluble, anionic dye and a vehicle comprising about 1 to 15 wt% of a member selected from the group consisting of glycols and lactams and the balance water.

24. The ink of claim 23 wherein said glycol is selected from the group consisting of ethylene glycol, diethylene glycol, triethylene glycol, tetraethylene glycol, propylene glycol, polyethylene glycol, polypropylene glycol, 1,5-pentanediol, and mixtures thereof.

25. The ink of claim 23 wherein said lactam is selected from the group consisting of 2-pyrrolidone, N-pyrrolidone, N-methyl pyrrolidone, N-hexyl pyrrolidone, N-(2-hydroxyethyl)pyrrolidone, caprolactam, and mixtures thereof.

26. The ink of claim 23 wherein said ink further comprises about 0.1 to 0.3 wt% of an alginate, about 0.5 to 5 wt% of a zwitterionic surfactant, and 0 to about 5 wt% of an acetylenic polyethylene oxide surfactant.

27. A thermal ink-jet ink comprising a vehicle and at least one dye and containing about 0.1 to 3 wt% of sodium cholate.

28. The ink of claim 27 wherein the concentration of said sodium cholate is about 0.5 wt%.

29. The ink of claim 27 comprising about 0.5 to 5 wt% of a water-soluble, anionic dye and a vehicle comprising about 1 to 15 wt% of a member selected from the group consisting of glycols and lactams and the balance water.

30. The ink of claim 29 wherein said glycol is selected from the group consisting of diethylene glycol and 1,5-pentanediol, and wherein said lactam is 2-pyrrolidone.

31. The ink of claim wherein said ink further comprises about 0.1 to 0.3 wt% of sodium alginate, about 0.5 to 5 wt% of N,N-dimethyl-N-(Z-9-octadecenyl)-N-amine oxide, and 0 to about 5 wt% of an acetylenic polyethylene oxide surfactant.

32. The ink of claim 23 wherein said quaternary ammonium salts are selected from the group consisting of tetramethylammonium and tetrabutylammonium salts.

* * * * *